No. 755,624. PATENTED MAR. 29, 1904.
J. D. CROWE.
PLOW ATTACHMENT.
APPLICATION FILED JUNE 5, 1903.
NO MODEL.
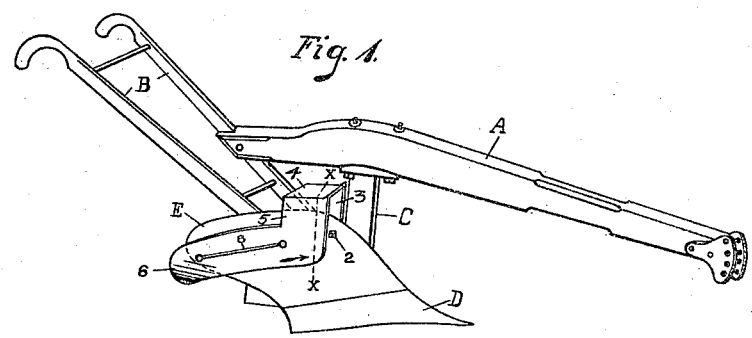
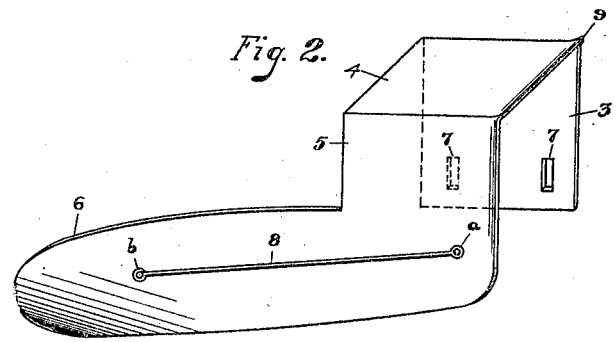
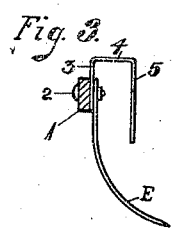
WITNESSES:
Edwin C. Dozier.
Herbert R. Marlatt.
JOHN D. CROWE.
INVENTOR.
BY Robert W. Randle
ATTORNEY.

No. 755,624. Patented March 29, 1904.

UNITED STATES PATENT OFFICE.

JOHN D. CROWE, OF WEBSTER, INDIANA.

PLOW ATTACHMENT.

SPECIFICATION forming part of Letters Patent No. 755,624, dated March 29, 1904.

Application filed June 5, 1903. Serial No. 160,211. (No model.)

*To all whom it may concern:*

Be it known that I, JOHN D. CROWE, a citizen of the United States, and a resident of Webster, in the county of Wayne and State of Indiana, have made certain new and useful Improvements in Plow Attachments, of which the following is a specification, which, when taken in connection with the accompanying drawings, forming a part thereof, is sufficiently clear and concise as to enable others skilled in the art to which it appertains to make and use the same.

The object of my invention, broadly speaking, is to provide a plow attachment and means for attaching same for use on breaking-plows whereby the labor of the operator will be reduced and at the same time accomplishing better results, especially in turning sod, than has heretofore been accomplished.

Another object is to provide a plow attachment designed to facilitate the turning of sod, whereby the sod being turned will be prevented from buckling and falling ahead of the moldboard of the plow, thus assuring accurate distribution and complete overturn of the sod.

Another object is to provide an attachment for plows which may be easily and quickly attached to breaking-plows, the efficacy of which will be apparent to any one familiar with the operation of farm-tools and the essential requisites of which are mathematically arranged in order to meet the emergencies in a mediocre way, and still another object is to provide a plow attachment which will be strong and durable in construction, positive in action, and which will be neat and attractive in appearance, and which can be manufactured and sold at a comparatively low price.

Other objects and advantages of my invention will appear from the following specific specification and from the drawings forming a part thereof.

My present invention consists in a plow attachment embodying new and useful features, details of construction, means of operation, and in the form and configuration of the parts substantially as particularly described otherwhere in this specification, and in the legitimate combinations herein set forth and described.

One manner of carrying out my invention, and that which in practice has been found to be the most desirable, is illustrated in the accompanying drawings, in which—

Figure 1 is a perspective view of a plow, showing my invention attached thereto in its essential relative position. Fig. 2 is a perspective view of my invention detached and complete and somewhat enlarged from that shown in Fig. 1. Fig. 3 is a cross-section of my invention and a portion of the moldboard of a plow, taken on the line X X of Fig. 1 in the direction of the arrow.

Similar reference characters refer to and denote like parts throughout the several views.

With the above-designated views in mind I will now take up the description of my invention in detail, which I will refer to as briefly and compactly as I may.

In detail the letter A denotes a plow-beam; B, the handles; C, the king-post; D, the plowshare; E, the moldboard and with a horizontal bar 1 extending rearward from the post C at a point adjacent the back of the moldboard E, to which the moldboard is secured by the bolts 2. All of said parts are of any well-known construction and adapted to be variously changed as desired.

My invention consists, essentially, of the integral device consisting of the vertical securing member 3, the horizontal outwardly-extending member 4, the vertical downwardly-extending member 5, together with the tailpiece 6, extending rearward from said member 5, as shown.

The device consisting of the members 3, 4, 5, and 6 is preferably formed of a single piece of comparatively heavy sheet metal bent or otherwise formed into substantially the configuration shown.

Through the lower portion of the member 3 is formed two or more slots 7, whose location is governed by the disposition of the bolts 2, with which they aline and through which said bolts are adapted to pass.

In order to stiffen and otherwise support the rear portion of the tailpiece 6, I have provided a brace-rod 8, the forward end of which is secured by a rivet *a* and the rear end secured by a rivet *b*, which rivets pass through the above-described members at substantially the points shown in the drawings.

In order to properly position and secure my attachment, the bolts 2 are first removed, after which the lower edge of the member 3 is inserted between the bar 1 and the moldboard E, bringing the slots 7 in alinement with the holes previously occupied by the bolts 2, after which the bolts 2 are inserted as before and properly tightened by their nuts, thus firmly clamping the member 3 between the moldboard E and the bar 1, the above being my preferred manner of attaching the device to a plow. However, it may be found more convenient or desirable to attach the member 3 to the opposite side of the bar 1 by said bolts or to other parts of the plow by bolts especially provided for that purpose. My attachment after being connected to a plow as above stated will present the relative appearance as shown in Fig. 1, by which it will be apparent that if the plow be in working operation in the usual manner the sod will be turned by the share and the moldboard and will in that position pass between the members 3 and 5 and the member 4 edgewise.

The tailpiece 6 is somewhat twisted, as indicated, from end to end thereof, with its face conforming with the curvature of the moldboard E at its points opposite thereto, with sufficient space therebetween for the sod to pass, and by which it will be apparent that the sod will be resiliently yet firmly held against the moldboard, yet will be sufficiently nclined toward the furrow previously made that it will fall thereinto in an inverted position after the plow has passed and by this means preventing the sod from buckling or from falling forward out of proper time.

The forward edge of the member 4 I prefer to form flaring upward, as indicated by the numeral 9, in order to guide thereunder any portion of the soil or sod which may extend slightly higher than said member 4, and also the forward edges of the members 3 and 5 may either or both flare outward, which will be of advantage where the land taken by the plow is of an extra thickness.

While I have illustrated and described the best means now known to me for successfully carrying out my invention and the essential requisites therefor, I desire it to be understood that I do not restrict myself to the exact details of construction enunciated and shown, but hold that any slight changes or variations in such details as would suggest themselves to the ordinary mechanic would clearly fall within the limit and scope of my invention.

Having now fully shown and described my invention, what I claim, and desire to secure by Letters Patent of the United States, is—

1. In combination with a plow having a beam and a moldboard, of an attachment consisting of an upwardly, outwardly, and downwardly extending member, with a tailpiece extending to near the rearmost point of the moldboard and corresponding with the contour thereof, a brace-rod extending over the outer face of the tailpiece and secured thereto by rivets, slots formed in the upwardly-extending portion of the device to receive bolts, and the forward edges of the device flaring outward, all substantially as shown and described.

2. A plow attachment comprising a vertical securing portion, an outwardly-extending horizontal portion, a downwardly-extending outer portion, a tail portion extending rearward from the latter, a stiffening-bar secured to and extending longitudinally of the tail portion, and means for securing the attachment to a plow, all substantially as shown and described.

In testimony whereof I have hereunto signed my name to this specification in the presence of two subscribing witnesses.

JOHN D. CROWE.

Witnesses:
Elizabeth M. Crowe,
R. W. Randle.